(12) United States Patent
Farmer

(10) Patent No.: US 10,047,914 B2
(45) Date of Patent: Aug. 14, 2018

(54) DRIVER-FREE LIGHT-EMITTING DEVICE

(71) Applicant: XENIO SYSTEMS, INC., San Francisco, CA (US)

(72) Inventor: Todd Farmer, Livermore, CA (US)

(73) Assignee: XENIO SYSTEMS, INC., San Francisco, CA (US)

( * ) Notice: Subject to any disclaimer, the term of this patent is extended or adjusted under 35 U.S.C. 154(b) by 0 days.

(21) Appl. No.: 14/331,197

(22) Filed: Jul. 14, 2014

(65) Prior Publication Data

US 2014/0321117 A1    Oct. 30, 2014

Related U.S. Application Data

(63) Continuation of application No. 13/228,247, filed on Sep. 14, 2012, now Pat. No. 9,091,399.
(Continued)

(51) Int. Cl.
*F21K 99/00* (2016.01)
*F21V 29/00* (2015.01)
(Continued)

(52) U.S. Cl.
CPC .................. *F21K 9/30* (2013.01); *F21K 9/20* (2016.08); *F21K 9/68* (2016.08); *F21V 29/004* (2013.01); *F21Y 2115/10* (2016.08)

(58) Field of Classification Search
CPC ....... H01L 2924/00; H01L 2924/12041; H01L 33/20; H01L 31/048; H01L 33/50; H01L 33/52; F21Y 2101/02; F21Y 2113/005; F21Y 2103/003; F21Y 2105/001; F21Y 2103/10; F21Y 2105/10; F21Y 2113/10; F21K 9/135; F21K 9/00; F21K 9/175; F21K 9/238; F21K 9/275; F21K 9/278; F21K 9/20; F21V 29/75; F21V 29/004; F21V 29/02; F21V 29/2212; F21V 17/10; F21V 23/00; F21V 23/001; F21V 29/70; F21V 29/713; F21V 29/74; F21V 17/12; F21V 23/008; F21V 23/0464; F21V 23/009; F21V 29/508
(Continued)

(56) References Cited

U.S. PATENT DOCUMENTS 4,298,869 A    11/1981  Okuno
4,729,076 A     3/1988  Masami et al.
(Continued)

FOREIGN PATENT DOCUMENTS

CN       1246912 C      3/2006
TW     200929517 A      7/2009
(Continued)

OTHER PUBLICATIONS

First Office Action dated May 19, 2014, and Search Report regarding Taiwan Patent Application No. TW 100141192.
(Continued)

*Primary Examiner* — Hargobind S Sawhney
(74) *Attorney, Agent, or Firm* — IPR Law Group PC

(57) ABSTRACT

A light source includes a plurality of solid state light emitters configured to be powered directly from an AC source, and means for providing an electrically insulating and thermally conductive attachment between the solid state light emitters and a heat sink.

12 Claims, 12 Drawing Sheets

Related U.S. Application Data

(60) Provisional application No. 61/412,743, filed on Nov. 11, 2010.

(51) Int. Cl.
*F21K 9/20* (2016.01)
*F21K 9/68* (2016.01)
*F21Y 115/10* (2016.01)

(58) Field of Classification Search
USPC .............. 362/238, 240, 241, 243, 245, 247, 362/249.02, 349.06, 249.14, 294, 373, 362/650; 315/187, 187 R, 185 S, 192
See application file for complete search history.

(56) References Cited

U.S. PATENT DOCUMENTS

| | | | |
|---|---|---|---|
| 4,939,426 A | 7/1990 | Menard et al. | |
| 5,726,535 A | 3/1998 | Yan | |
| 5,813,753 A | 9/1998 | Vriens et al. | |
| 6,252,254 B1 | 6/2001 | Soules et al. | |
| 6,345,903 B1 | 2/2002 | Koike et al. | |
| 6,388,393 B1 | 5/2002 | Illingsworth | |
| 6,641,284 B2* | 11/2003 | Stopa | F21S 48/328 362/235 |
| 6,734,465 B1 | 5/2004 | Taskar et al. | |
| 6,917,057 B2 | 7/2005 | Stokes et al. | |
| 7,102,152 B2 | 9/2006 | Chua et al. | |
| 7,226,189 B2* | 6/2007 | Lee | F21V 3/00 362/294 |
| 7,255,460 B2 | 8/2007 | Lee | |
| 7,259,400 B1 | 8/2007 | Taskar | |
| 7,281,818 B2 | 10/2007 | You et al. | |
| 7,374,807 B2 | 5/2008 | Parce et al. | |
| 7,625,104 B2 | 12/2009 | Zhang et al. | |
| 7,722,227 B2 | 5/2010 | Zhang et al. | |
| 7,824,075 B2 | 11/2010 | Maxik | |
| 7,857,485 B2 | 12/2010 | Wang et al. | |
| 7,918,587 B2 | 4/2011 | Hsu et al. | |
| 8,072,130 B2 | 12/2011 | Wang et al. | |
| 8,294,356 B2 | 10/2012 | Suwa et al. | |
| 8,360,606 B2 | 1/2013 | Takei et al. | |
| 8,445,933 B2* | 5/2013 | Lee | F21K 9/00 257/100 |
| 2006/0141851 A1* | 6/2006 | Matsui | F21K 9/00 439/490 |
| 2006/0215408 A1* | 9/2006 | Lee | F21V 9/08 362/294 |
| 2007/0230171 A1 | 10/2007 | Hiratsuka | |
| 2008/0043478 A1* | 2/2008 | Wang | F21K 9/00 362/373 |
| 2008/0054814 A1* | 3/2008 | Deppe | H05B 33/0803 315/192 |
| 2008/0151576 A1 | 6/2008 | Inditsky | |
| 2009/0009100 A1* | 1/2009 | Rooymans | H05B 33/0824 315/246 |
| 2009/0086484 A1 | 4/2009 | Johnson | |
| 2009/0167202 A1* | 7/2009 | Miskin | H05B 33/0818 315/250 |
| 2009/0283779 A1 | 11/2009 | Negley et al. | |
| 2009/0303715 A1 | 12/2009 | Takasago et al. | |
| 2010/0061108 A1 | 3/2010 | Zhang et al. | |
| 2010/0117099 A1* | 5/2010 | Leung | H01L 25/0753 257/88 |
| 2010/0124058 A1 | 5/2010 | Miller | |
| 2010/0149818 A1* | 6/2010 | Ruffin | F21V 17/10 362/294 |
| 2010/0232158 A1 | 9/2010 | McCanless | |
| 2010/0237800 A1* | 9/2010 | Kang | H05B 33/0809 315/294 |
| 2010/0270935 A1* | 10/2010 | Otake | H05B 33/0803 315/185 R |
| 2011/0227489 A1* | 9/2011 | Huynh | H05B 33/083 315/185 R |
| 2013/0020952 A1 | 1/2013 | Liao et al. | |

FOREIGN PATENT DOCUMENTS

| | | |
|---|---|---|
| TW | 201003890 A | 1/2010 |
| TW | 201022585 A | 6/2010 |
| TW | 201029145 A | 8/2010 |

OTHER PUBLICATIONS

International Preliminary Report on Patentability, International Search Report and Written Opinion dated Feb. 29, 2012, in International Application No. PCT/US2011/060067 (IPRP dated May 14, 2013).

International Preliminary Report on Patentability, International Search Report and Written Opinion dated May 23, 2013, in International Application No. PCT/US2011/060070 (IPRP dated May 14, 2013).

* cited by examiner

DRIVER-FREE LIGHT-EMITTING DEVICE

CLAIM OF BENEFIT TO PRIOR APPLICATIONS

This Application is a continuation of U.S. patent application Ser. No. 13/228,247, entitled "Driver-Free Light-Emitting Device," filed Sep. 14, 2012, which claims the benefit of U.S. Provisional Patent Application 61/412,743, entitled "Driver-Free Light-Emitting Device," filed on Nov. 11, 2010. U.S. patent application Ser. No. 13/228,247 and U.S. Provisional Patent Application 61/412,743 are incorporated herein by reference.

BACKGROUND

Field

The present disclosure relates to light sources, and more particularly to a driver-free light-emitting devices.

Background

Solid state devices, such as light emitting diodes (LED)s, are attractive candidates for replacing conventional light sources such as incandescent, halogen and fluorescent lamps. LEDs have substantially higher light conversion efficiencies than incandescent and halogen lamps and longer lifetimes than all three of these types of conventional light sources. In addition, some types of LEDs now have higher conversion efficiencies than fluorescent light sources and still higher conversion efficiencies have been demonstrated in the laboratory. Finally, LEDs require lower voltages than fluorescent lamps and contain no mercury or other potentially dangerous materials, therefore, providing various safety and environmental benefits.

More recently, solid state devices have been used to replace high-intensity discharge (HID) lamps to provide high levels of light over large areas when energy efficiency and/or light intensity are required. These areas include roadways, parking lots, pathways, large public areas, and other outdoor applications. To increase the intensity of light in these applications, often more than one solid state light emitter is arranged in a package. An example of a solid state light emitter is a light emitting semiconductor chip comprising a p-n junction. An example of a package is a collection of light emitters arranged on a substrate and encapsulated in a phosphor to produce broad spectrum white light. This package is sometimes referred to as an "LED device." A heat sink is often attached to the LED device to dissipate heat generated by the light emitters.

LED devices are subject to various safety testing requirements prescribed by different authorities such as Underwriter Laboratories (UL), Conformite Europene (CE), and the like. In some of these testing procedures, the LED device must withstand a high potential between the substrate and the heat sink. If the LED device design is unable to withstand the required voltage, an isolated driver may be required to power the LED device. An isolated driver, typically referred to as a "Class 2 driver," provides electrical isolation between the primary power source (e.g., wall plug) and the LED array. If, on the other hand, the LED device design is capable of withstanding the required voltage because sufficient isolation may be achieved between the LED device and heat sink, a non-isolated driver may be used to power the LED device. A non-isolated driver, typically referred to as a "Class 1 driver," is less expensive than a Class 2 driver, and therefore, reduces the manufacturing costs. However, an LED device design that eliminates the need for a driver altogether would provide further cost benefits, as well as improve reliability, reduce maintenance, and simplify the conversion from conventional light sources currently being used in incandescent, fluorescent, halogen, (HID), and other similar lamps to solid state light emitters.

SUMMARY

One aspect of a light source includes a plurality of solid state light emitters configured to be powered directly from an AC source, and means for providing an electrically insulating and thermally conductive attachment between the solid state light emitters and a heat sink.

Another aspect of a light source includes a plurality of solid state light emitters configured to be powered directly from an AC source, and a thermally conductive mounting fixture supporting the light emitters, wherein the mounting fixture is configured to be attached to a heat sink while providing electrical insulation between the light emitters and the heat sink.

A further aspect of a light source includes a plurality of solid state light emitters configured to be powered directly from an AC source, and a thermally conductive mounting frame having a center and a periphery, the light emitters positioned in the center of the mounting fixture, and wherein the mounting frame is configured to be attached to a heat sink at the periphery.

It is understood that other aspects of the present invention will become readily apparent to those skilled in the art from the following detailed description, wherein it is shown and described only exemplary configurations of a light source by way of illustration. As will be realized, the present invention includes other and different aspects of a light source and its several details are capable of modification in various other respects, all without departing from the spirit and scope of the present invention. Accordingly, the drawings and the detailed description are to be regarded as illustrative in nature and not as restrictive.

BRIEF DESCRIPTION OF THE FIGURES

Various aspects of the present invention are illustrated by way of example, and not by way of limitation, in the accompanying drawings, wherein.

DETAILED DESCRIPTION

Figure 1:
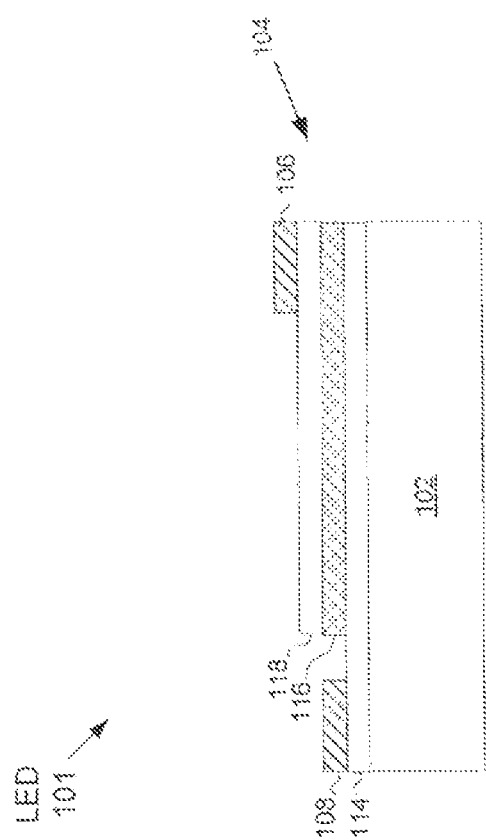
FIG. 1 is a conceptual cross-sectional side view illustrating an example of an LED.

The present invention is described more fully hereinafter with reference to the accompanying drawings, in which various aspects of the present invention are shown. This invention, however, may be embodied in many different forms and should not be construed as limited to the various aspects of the present invention presented throughout this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "lower" side of other elements would then be oriented on the "upper" side of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various aspects of a light source will now be presented. However, as those skilled in the art will readily appreciate, these aspects may be extended to other light sources without departing from the spirit and scope of the invention. The light source may include a plurality of solid state light emitters configured to be powered directly from an AC source, and a means for providing an electrically insulating and thermally conductive attachment between the solid state light emitters and a heat sink. The means for providing an electrically insulating and thermally conductive attachment between the solid state light emitters and a heat sink may be mounting fixture or other suitable device, now known or later developed. The mounting fixture may be configured to be attached to the heat sink while providing electrical insulation between the light emitters and the heat sink. In one configuration of a light source, a thermally conductive mounting frame may support the light emitters at the center and attach to the heat sink at the periphery.

An example of a solid state light emitter is an LED. The LED is well known in the art, and therefore, will only briefly be discussed to provide a complete description of the invention. FIG. 1 is a conceptual cross-sectional side view illustrating an example of an LED. An LED is a semiconductor material impregnated, or doped, with impurities. These impurities add "electrons" and "holes" to the semiconductor, which can move in the material relatively freely. Depending on the kind of impurity, a doped region of the semiconductor can have predominantly electrons or holes, referred to as an n-type or p-type semiconductor region, respectively. In LED applications, the semiconductor includes an n-type semiconductor region and a p-type semiconductor region. A reverse electric field is created at the junction between the two regions, which cause the electrons and holes to move away from the junction to form an active region. When a forward voltage sufficient to overcome the reverse electric field is applied across the p-n junction, electrons and holes are forced into the active region and combine. When electrons combine with holes, they fall to lower energy levels and release energy in the form of light.

Referring to FIG. 1, the LED 101 includes a substrate 102, an epitaxial-layer structure 104 on the substrate 102, and a pair of electrodes 106 and 108 on the epitaxial-layer structure 104. The epitaxial-layer structure 104 comprises an active region 116 sandwiched between two oppositely doped epitaxial regions. In this example, an n-type semiconductor region 114 is formed on the substrate 102 and a p-type semiconductor region 118 is formed on the active region 116, however, the regions may be reversed. That is, the p-type semiconductor region 118 may be formed on the substrate 102 and the n-type semiconductor region 114 may formed on the active region 116. As those skilled in the art will readily appreciate, the various concepts described throughout this disclosure may be extended to any suitable epitaxial-layer structure. Additional layers (not shown) may also be included in the epitaxial-layer structure 104, including but not limited to buffer, nucleation, contact and current spreading layers as well as light extraction layers.

The electrodes 106 and 108 may be formed on the surface of the epitaxial-layer structure 104. The p-type semiconductor region 118 is exposed at the top surface, and therefore, the p-type electrode 106 may be readily formed thereon. However, the n-type semiconductor region 114 is buried beneath the p-type semiconductor region 118 and the active region 116. Accordingly, to form the n-type electrode 108 on the n-type semiconductor region 114, a portion of the active region 116 and the p-type semiconductor region 118 is removed to expose the n-type semiconductor region 114 therebeneath. After this portion of the epitaxial-layer structure 104 is removed, the n-type electrode 108 may be formed.

Figure 2:
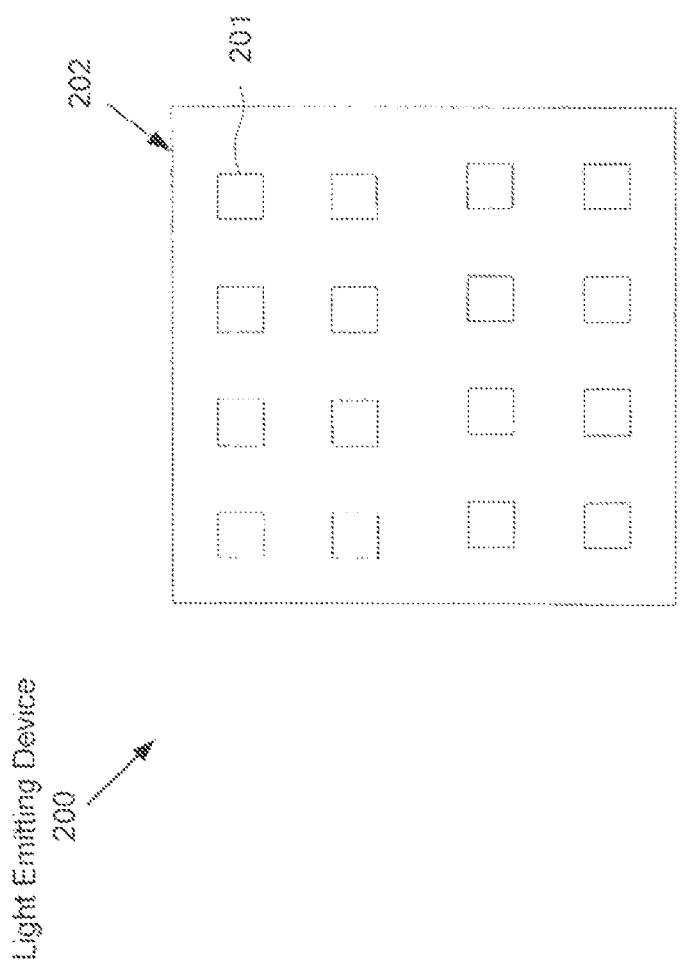
FIG. 2 is a conceptual cross-sectional view illustrating an example of an LED coated with a phosphor material.

One or more light emitters may be used to construct an LED device. An LED device having multiple light emitters disposed on a single substrate, as will be described in connection with FIG. 2, is sometimes referred to as an "LED array." However, as those skilled in the art will readily appreciate, the present invention is not limited to LED arrays, and may be extended to any suitable LED device or other suitable solid state light source. One example of an LED device will now be presented with reference to FIG. 2. FIG. 2 is a conceptual top view illustrating an example of an LED device. In this example, an LED device 200 is configured with multiple LEDs 201 arranged on a substrate 202. The substrate 202 may be made from any suitable material that provides mechanical support to the LEDs 201. Preferably, the material is thermally conductive to dissipate heat away from the LEDs 201. The substrate 202 may include a dielectric layer (not shown) to provide electrical insulation between the LEDs 201. The LEDs 201 may be electrically coupled in parallel and/or series by a conductive circuit layer, wire bonding, or a combination of these or other methods on the dielectric layer.

The LED device may be configured to produce white light. White light may enable the LED device to act as a direct replacement for conventional light sources used today in incandescent, halogen, fluorescent, HID, and other suitable lamps. There are at least two common ways of producing white light. One way is to use individual LEDs that emit wavelengths (such as red, green, blue, amber, or other colors) and then mix all the colors to produce white light. The other way is to use a phosphor material or materials to convert monochromatic light emitted from a blue or ultraviolet (UV) LED to broad-spectrum white light. The present invention, however, may be practiced with other LED and phosphor combinations to produce different color lights.

Figure 3A:
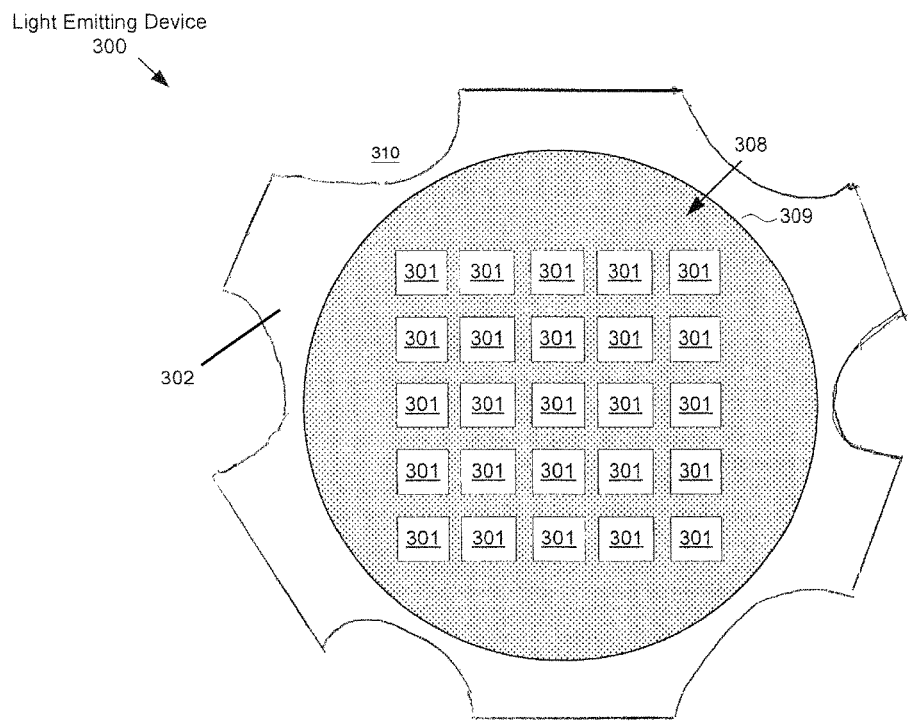
FIG. 3A is a conceptual top view illustrating an example of a white light source.
Figure 3B:
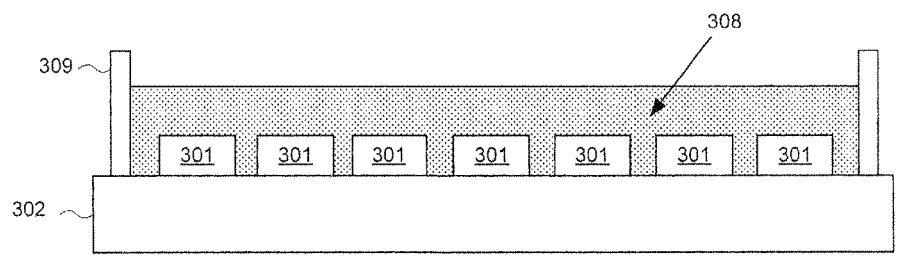
FIG. 3B is a conceptual cross-sectional side view of the white light source in FIG. 3A.

An example of an LED device will now be presented with reference to FIG. 3. FIG. 3A is a conceptual top view illustrating an example of a white light LED device and FIG. 3B is a conceptual cross-sectional side view of the white light LED device in FIG. 3A. The white light LED device 300 is shown with a substrate 302 which may be used to support multiple LEDs 301. The substrate 302 may be configured in a manner similar to that described in connection with FIG. 2 or in some other suitable way. In this example, the substrate includes a plurality of slots 310 along the periphery. A phosphor material 308 may be deposited within a cavity defined by an annular, or other shaped, or other boundary 309 that extends circumferentially, or in any shape, around the upper surface of the substrate 302. The annular boundary 309 may be formed with a suitable mold, or alternatively, formed separately from the substrate 302 and attached to the substrate 302 using an adhesive or other suitable means. The phosphor material 308 may include, by way of example, phosphor particles suspended in an epoxy, silicone, or other carrier or may be constructed from a soluble phosphor that is dissolved in the carrier.

In an alternative configuration of a white light emitting element, each LED may have its own phosphor layer. As those skilled in the art will readily appreciate, various configurations of LEDs and other light emitting cells may be used to create a white light emitting element. Moreover, as noted earlier, the present invention is not limited to solid state lighting devices that produce white light, but may be extended to solid state lighting devices that produce other colors of light.

Figure 4A:
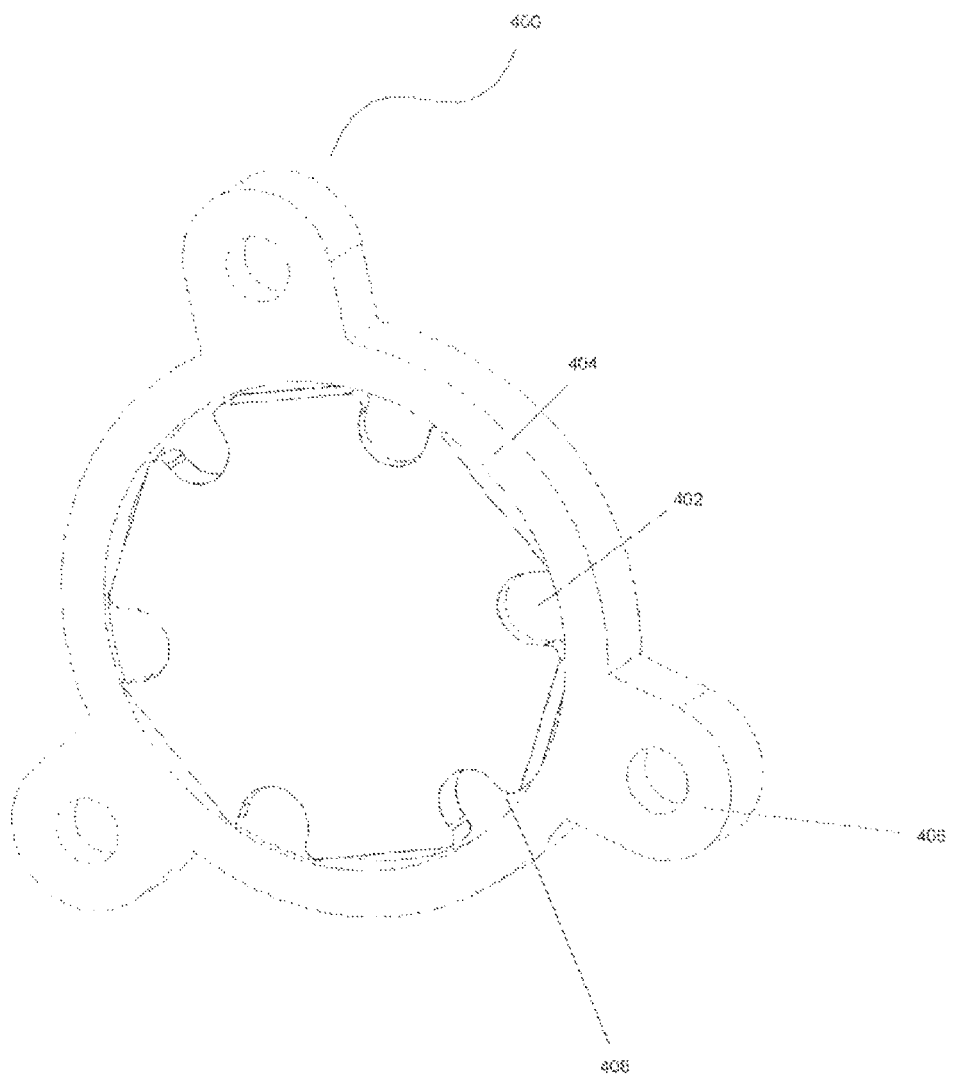
FIG. 4A is a perspective bottom view illustrating an example of a mounting fixture.
Figure 4B:
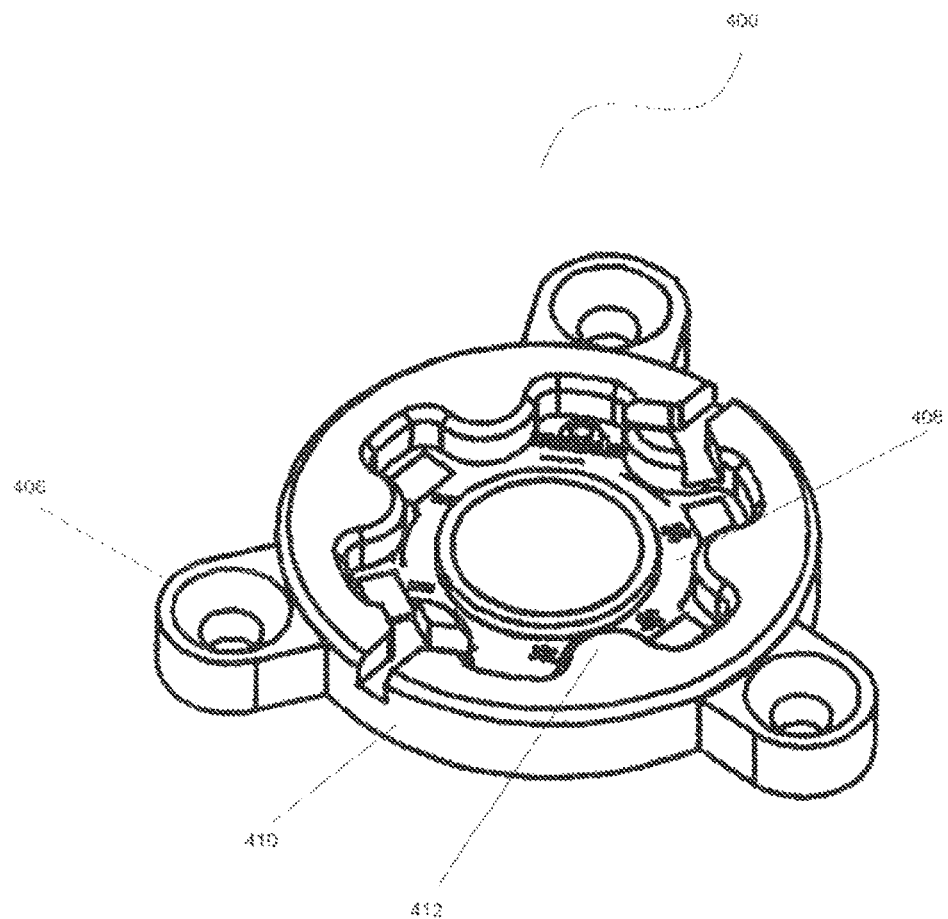
FIG. 4B is a perspective top view illustrating an example of a mounting fixture in FIG. 4A.

FIG. 4 is an exploded view illustrating a conceptual example of a mounting fixture for attaching an LED device, or other package of light emitters, to a heat sink, where FIG. 4A depicts a bottom view and FIG. 4B depicts a top view. The mounting fixture 400 includes a means for attaching the mounting fixture to an LED device 408. Such an LED device may be, by way of example, an LED device as depicted in FIG. 3. The illustrated example of the attachment means includes a plurality of protrusions 402 matching in shape the plurality of slots 310 in the substrate 302 of the LED device from FIG. 3. In one configuration of a mounting frame, the tolerance of surfaces of the matching slots is such that a fit which enables the LED device 408 to be inserted in and removed from the mounting fixture 400 without tools, prevents the LED device 408 from falling from the mounting fixture 400 during subsequent manipulation. One skilled in the art will appreciate that although a particular configuration of attaching an LED device 408 to a mounting fixture 400 has been described, the LED device 408 may be attached in other ways, by way of example, with screws, clamps, glue, and the like. One skilled in the art will further appreciate that because the shape of the LED device 408 and, consequently the mounting fixture 400, is well suited for many applications, other shapes are within the scope of the present invention.

As will be explained in greater detail later, the mounting fixture 400 may be attached to a heat sink to dissipate heat generated by the LED device 408. In order to electrically insulate the substrate 302 (see FIG. 3) from the heat sink, an intermediate layer may be disposed between the substrate 302 and the heat sink. The intermediate layer may be a material with high thermal conductivity and high electrical insulating properties, e.g., silicon paste, silicon pad, or other materials known to a person skilled in the art. In one configuration of a mounting fixture, the bottom face 404 of the mounting fixture 400 and the bottom face of the substrate 302 (see FIG. 3) of the LED device 408 are aligned to be substantially level and flat, i.e., the irregularities in the level and flatness would not cause gaps between the bottom face of the substrate 302 and an intermediate layer when the substrate 302 is attached to the heat sink.

Alternatively, the bottom face of the substrate 302 (see FIG. 3) may be recessed, i.e., disposed below the bottom face 404 of the mounting fixture 400 by a dimension allowing for dimensional distortion of the intermediate layer due to a pressure exerted on the intermediate layer when the substrate 302 is attached to a heat sink. Such an arrangement ensures consistent pressure among the components.

The means for achieving the above-described alignment comprises a plurality of protrusions 412 formed in the body 410 of the mounting fixture 400 which act as stops preventing the LED device 408 to slide through the opening in the body 410. The height of the plurality of protrusions 412 establishes either the substantially level and flat or the recessed alignment.

To accommodate attachment of the substrate 302 to a heat sink, the mounting fixture 400 comprises attachment means. In one configuration of a mounting fixture, depicted in FIG. 4, the means comprises a plurality of semi-circular flanges 406 for locating screws, the means being located at a distance away from the outside of the substrate 302 (see FIG. 3). One skilled in the art will appreciate that other shape of the flanges 406, or a continuous flange, arc within the scope of the present invention. The distance between the outside of the substrate 302 and the location of the screws is determined in accordance with a testing voltage and an applicable standard. As a means of an example, the UL test standard recommends an air-gap distance as a function of applied voltage, e.g., 6 mm air-gap distance for 240 volts.

Figure 5:
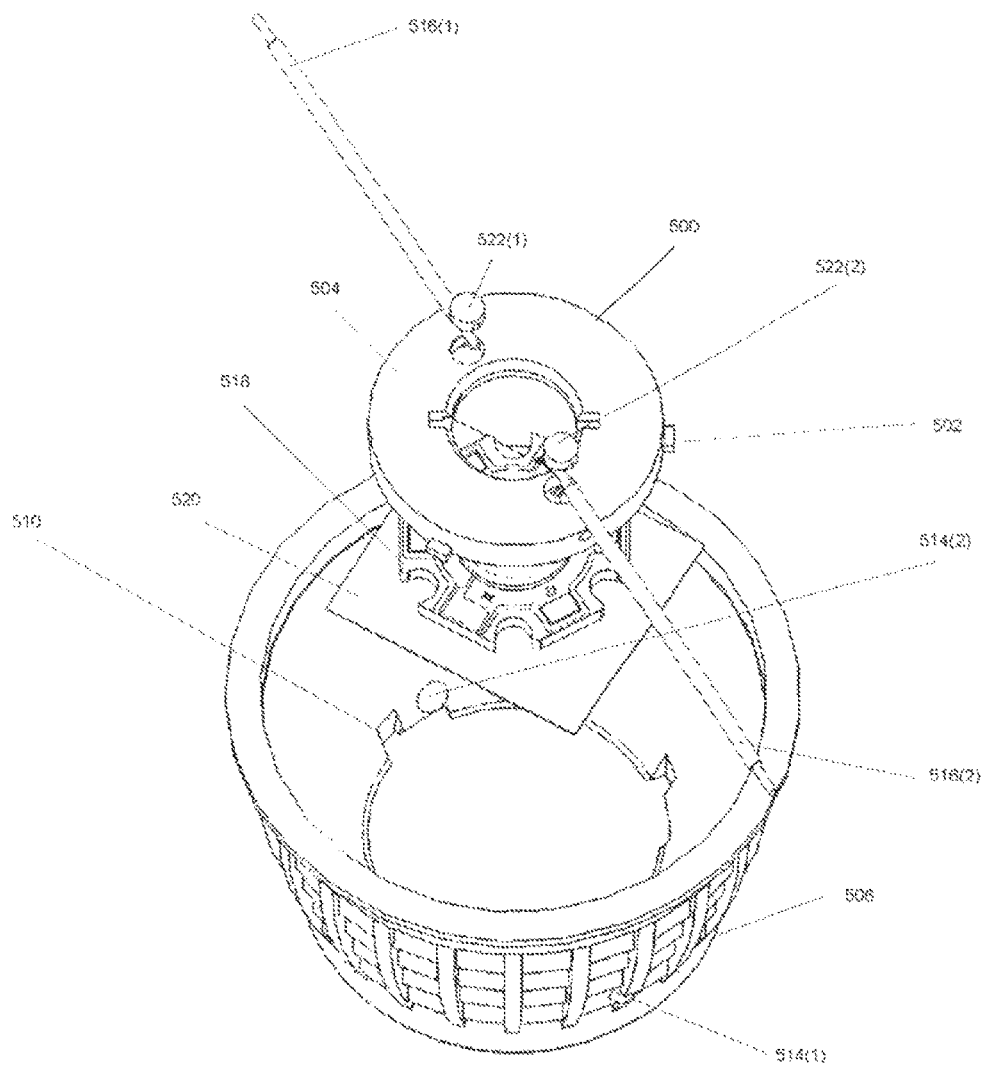
FIG. 5 is an exploded view illustrating an example of an LED device and a heat sink.

In an alternative configuration of a mounting fixture depicted in FIG. 5, the mounting fixture 500 comprises attachment means depicted as a plurality of locking posts 502, perpendicular to the side wall 504. A person skilled in the art will appreciate that although the locking posts 502 are depicted as flange-shaped, other shapes, e.g., pins, allowing for the below described locking action are within the scope of the present invention.

A heat sink 506 comprises attachment means enabling screw less attachment of the mounting fixture 500 to the heat sink 506. A diameter of an opening 508 is dimensioned to accept the mounting fixture 500. A plurality of slots 510, matching the plurality of locking posts 502, is introduced into the heat sink 506. The plurality of slots 510 does not extent through the height of the heat sink 506, but ends in second plurality of slots 512, matching the plurality of slots 510, introduced into the heat sink 506. The second plurality of slots 512 starts on the bottom of the plurality of slots 510 and is parallel with or tilted downwards towards the bottom of the heat sink 506.

To attach the mounting fixture 500 to the heat sink 506, the plurality of locking posts 502 are aligned with the plurality of slots 510 and the mounting fixture 500 is disposed into the opening 510. When the locking posts 502 reach the bottom of the slots 510 the mounting fixture 500 is twisted in the direction of the plurality of slots 512. The friction between the plurality of locking posts 502 and the plurality of slots 512 keeps the mounting fixture 500 to the heat sink 506.

A plurality of openings 514 (two openings 514(1), 514(2) shown), are introduced into the heat sink 506, to allow wire leads 516(1), 516(2) to reach the mounting fixture 500 and be attached to an LED device 518. As depicted a screw less attachment as disclosed in reference to FIG. 6 and associated text, two electrically non-conducting caps 522(1), 522(2) are also shown in FIG. 5.

Figure 6:
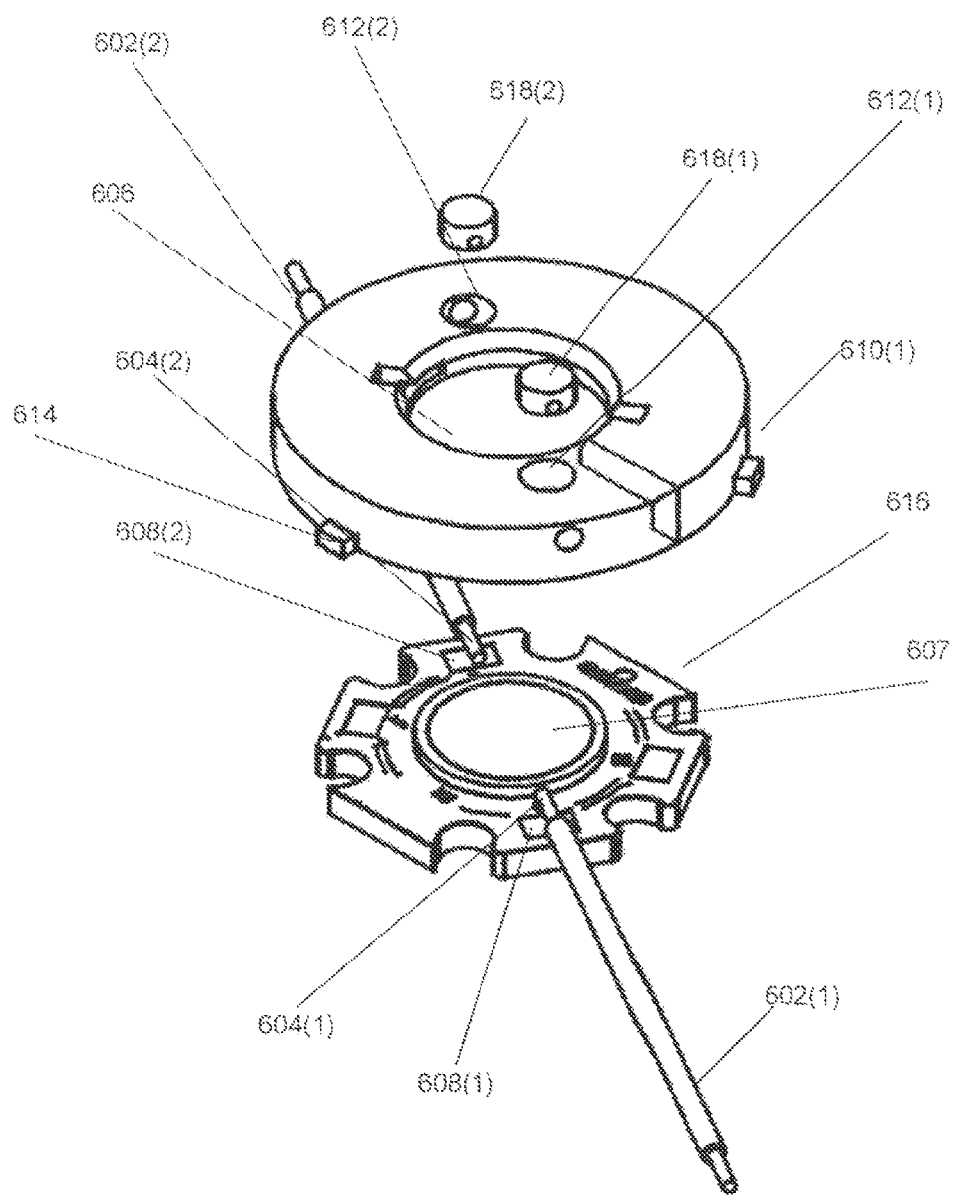
FIG. 6 is an exploded view illustrating an example of mounting fixture with means for attaching wire leads from an electrical power source to an LED device.

Referring now to FIG. 6, the mounting fixture 600 further comprises means for attaching wire leads 602, from an electrical power source (not shown) to the LED device 600 without the need of soldering and further without exposing non-insulated part 604 of the wire leads 602 to touch. As depicted, the opening 606 in the mounting fixture 600 is dimensioned to accommodate the electrical and optical layers 607. Consequently, the mounting fixture 600 extends above at least two attachment points 608 (two attachment points 608(1), 608(2) shown), of the LED device 600. The attachment points 608 comprise a soldering pad or any other means for providing electric power to the electrical and optical layers 607. At least two openings 610 (two openings 610(1), 610(2) shown), are introduced into the mounting fixture 600 extending above the attachment point 608. The openings 610(1), 610(2) can extent throughout the thickness of the mounting fixture 600 or, alternatively, be blind on the inside of the mounting fixture 600. Another at least two openings 612 (two openings 612(1), 612(2) shown), are introduced into the mounting fixture 600 connecting the inside of the openings 610(1), 610(2) with the bottom face 614 of the mounting fixture 600. When the LED device 616 is inserted in the mounting fixture 600 an electrically conducting contact 618 is in contact with the attachment point 608(1) and protrudes into the opening 610(1). The wire leads 602 from an electrical power source (not shown) to the LED device 616 inserted into the at least two openings 610(1), 610(2) attach to the protruding end of the electrically conducting contact 618.

A person skilled in the art will appreciate that the above-described attachment means can be implemented in many alternatives known from respective related technologies. By means of an example, the electrically conducting contact 618 can be attached to the attachment point 608, e.g., by soldering. The attachment between the wire leads (not shown) and the protruding end of the electrically conducting contact 618 can then be implemented by inserting the wire leads 602 into the at least two openings 610(1), 610(2) and pinning the wire leads between the opening 610 and the eclectically conducting contact 618 by inserting the LED device 616 in the mounting fixture 600. By means of another example, the electrically conducting contact 618 can be disposed into the at least two openings 612(1), 612(2) and come into contact with the attachment point 608 by inserting the LED device 616 in the mounting fixture 600. The attachment between the wire leads 602 and the protruding end of the electrically conducting contact 618 can then be implemented by inserting the wire leads 602 into the at least two openings 610(1), 610(2) thus pinning the wire leads between the opening 610 and the electrically conducting contact 618. The conducting contact 618 is enclosed by an electrically non-conducting cap 620 (not shown); consequently, the conducting contact 618 is not exposed to touch.

Figure 7:
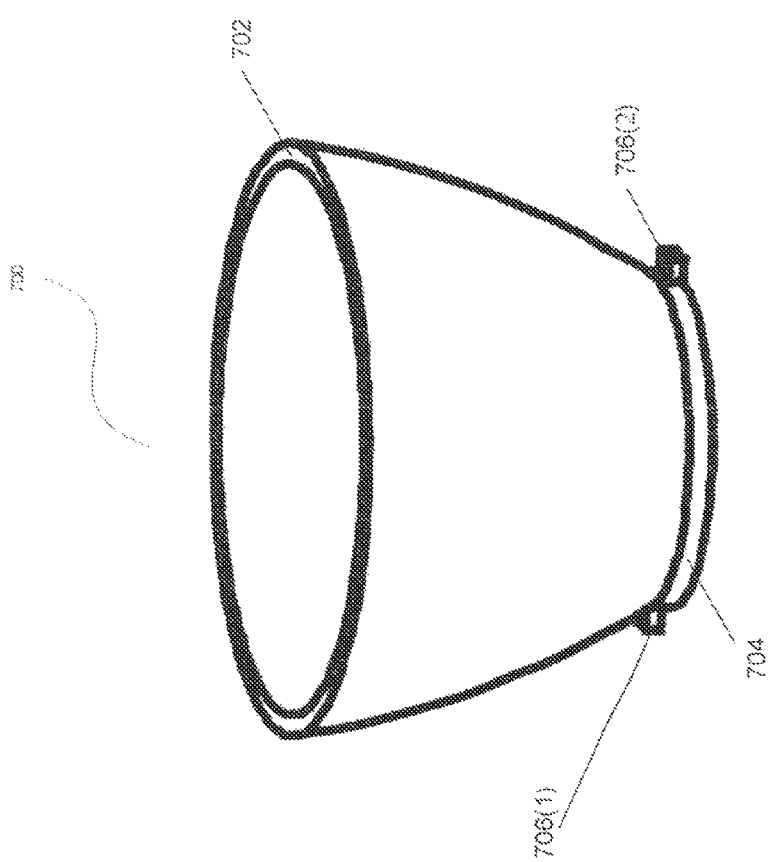
FIG. 7 is a perspective view illustrating an example of a reflector.

FIG. 7 depicts a conceptual example of a reflector 700. The reflector 700 comprises a body 702 and a flange 704. A plurality of locking posts 706, perpendicular to the bottom flange serve as attachment means to a mounting fixture 800 depicted in FIG. 8. A person skilled in the art will appreciate that although the locking posts 706 are depicted as flange-shaped, other shapes, e.g., pins, allowing for the below described locking action are within the scope of the disclosed aspect.

Figure 8:
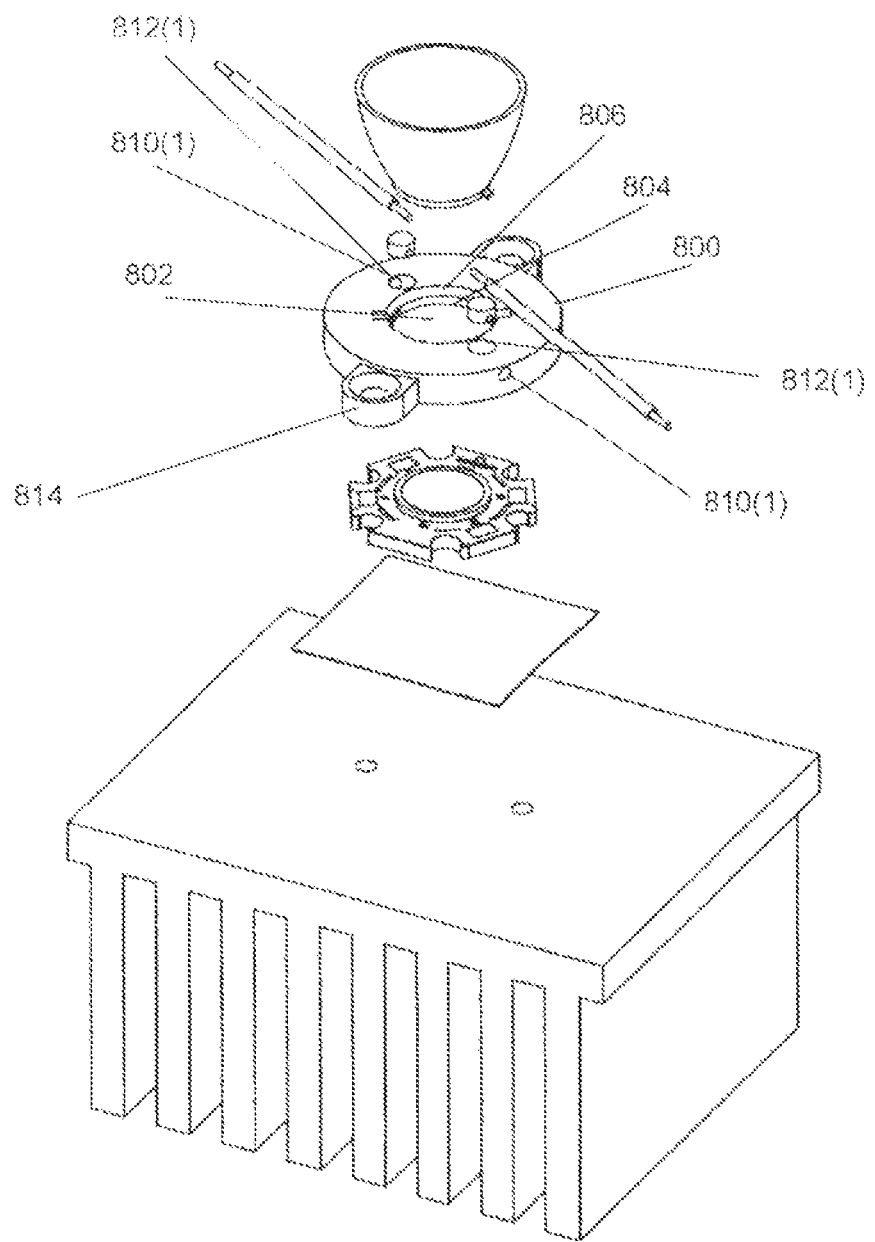
FIG. 8 is an exploded view illustrating an example of a mounting fixture with attachment means for the reflector in FIG. 7.

FIG. 8 depicts a conceptual example of a mounting fixture 800 comprising attachment means enabling disassembleable attachment of the reflector 700 (see FIG. 7) to the mounting fixture 800. The opening 802 is dimensioned both as to the diameter and the height of the face 804 to accept the bottom flange 704. Above the height of the face 804, the opening 802 is relieved with an included angle greater than the greatest included angle of the reflector body 702, creating a face 806, thus enabling the mounting fixture 800 to be used without modification with reflectors with different included angles. A plurality of slots 808 (matching the plurality of locking posts 706) is introduced into the mounting fixture 800. The plurality of the slots 808 does not extent through the height of the mounting fixture 800. A second plurality of slots 810 (matching the plurality of the slots 808) is introduced into the mounting fixture 800. The second plurality of slots 810 starts on the bottom of the plurality of slots 808 and is parallel with or tilted downwards or upwards in reference to the bottom of the mounting fixture 800.

Figure 9:
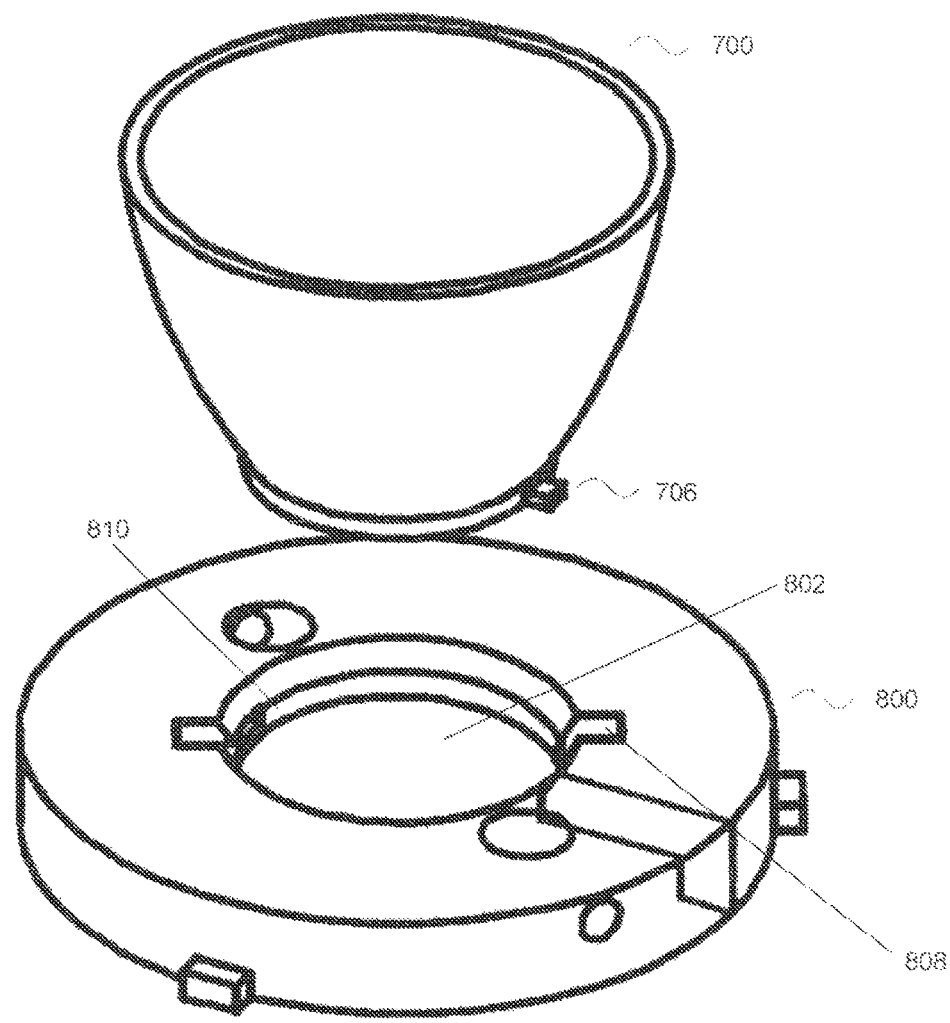
FIG. 9 is an exploded view illustrating an example of the assembly of the reflector in FIG. 7 and attachment means in FIG. 8.

Referring now to FIG. 9, which for clarity retained the references from FIG. 7 and FIG. 8, to attach the reflector 700 to the mounting fixture 800, the plurality of locking posts 706 are aligned with the plurality of slots 808 and the reflector flange 704 is disposed into the opening 802. When locking posts 706 reach the bottom of the slots 808 the reflector is twisted in the direction of the slots 810. The friction between the plurality of locking posts 706 and the plurality of slots 810 keeps the reflector 700 attached to the mounting fixture 800.

A person skilled in the art will appreciate that the different aspects disclosed in reference to a particular figure and an associated text are not to be considered as applicable only to the particular figure and the associated text, but can be combined to result in a mounting fixture best suited for a given design goal. Consequently, a particular mounting fixture may, but does not have to include all the different aspects of the present invention disclosed herein. Thus, by means of an example, if a mounting fixture is to be used with a LED device comprising soldering pads, it may be difficult or costly to design solder free wire leads connection. However, other disclosed aspects of the present invention, e.g., screw free attachment of the mounting fixture to a heat sink, disassemble able attachment of a reflector to the mounting fixture and/or other disclosed aspects can be incorporated in the final design of the mounting fixture. Furthermore, a screw free attachment of the mounting fixture to a heat sink will not work if a design goal requires the heat sink to be flat.

By means of a particular example refer back to FIG. 8, showing a reflector 700 (see FIG. 7) disassembled from the mounting fixture 800, but comprises at least two slots 810 (two openings 810(1), 810(2) shown), for lead wires (not shown) ending in matching plurality of openings 812 through which the lead wires are soldered to an attachment point (not shown) on a substrate (not shown). Furthermore, the mounting fixture 800 comprises openings 814(1), 814(2) for locating screws (not shown) as described in connection with FIG. 4, because the fixture is intended to be mounted on a flat heat sink.

Figure 10:
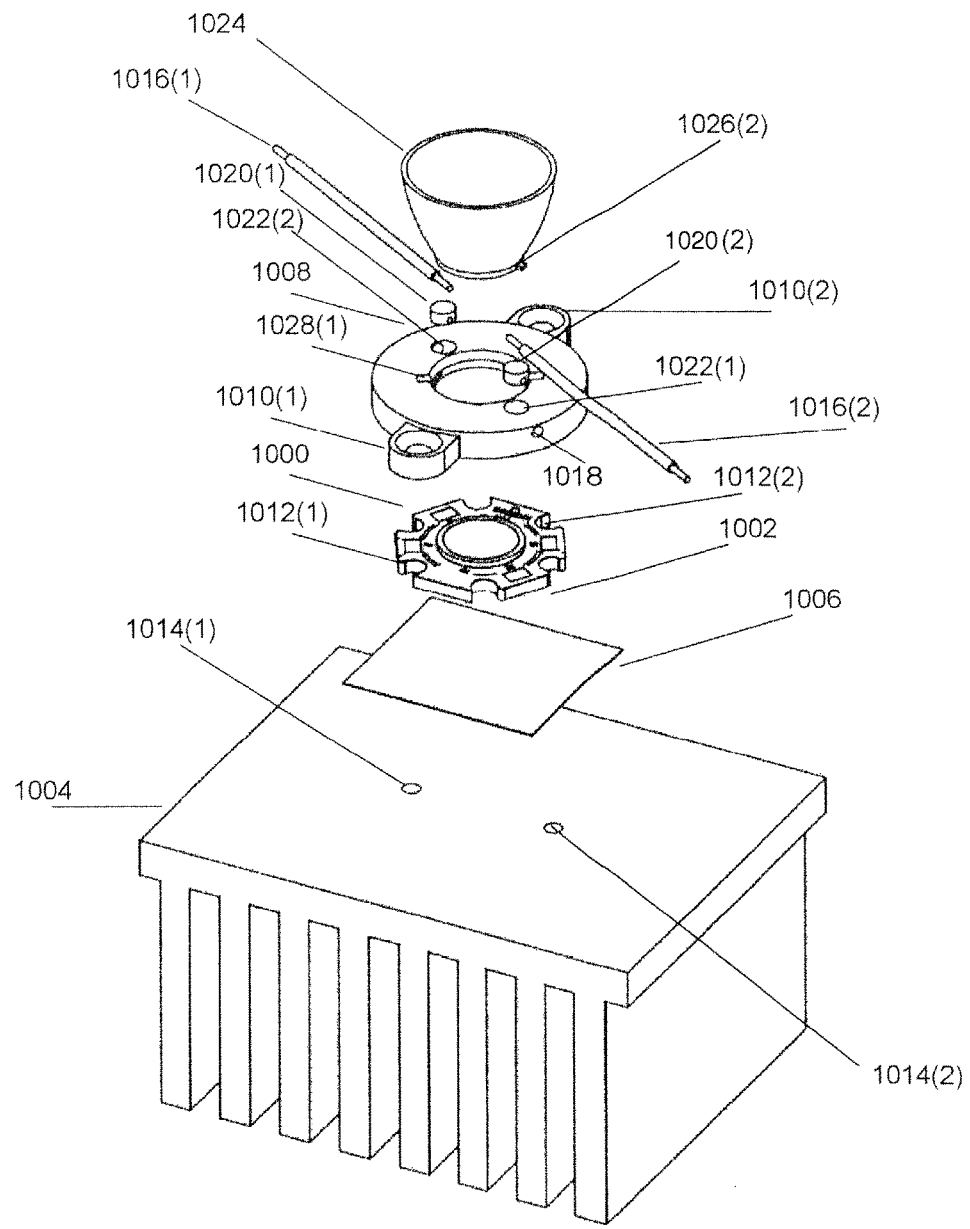
FIG. 10 is an exploded view illustrating an example of the assembly of an LED device and a heat sink.

FIG. 10 depicts an exploded view of a conceptual assembly of an exemplary light-emitting device array 1000 and a flat heat sink 1004. In order to electrically insulate the LED device substrate 1002 from the heat sink 1004, an intermediate layer 1006 is disposed between the substrate 1002 and the heat sink 1004. The intermediate layer 1006 comprises a material with high thermal conductivity and high electrically insulating property, e.g., silicon paste, silicon pad or other materials known to a person skilled in the art. A mounting fixture 1008 (such as a mounting fixture according to FIG. 4 or FIG. 8 and associated text) is used to attach the LED device 1000 to the heat sink 1004. The attachment is provided by a plurality of screws (not shown) fitting into a plurality of semi-circular flanges 1010 (two flanges shown). The plurality of screws passes through a plurality of slots 1012 in the substrate 1002 and is threaded into a plurality of holes 1014 in the heat sink 1004. Wire leads 1016 from an electrical power source are attached to the LED device 1000. As shown, the wire leads 1016 are inserted into the openings 1018 and attach to the protruding end of the electrically conducting contacts 1020 inserted into the at least two openings 1022. As shown, a reflector 1024 is attached to the mounting fixture 1008 by means of a plurality of locking posts 1026 aligned with plurality of slots 1028.

The various aspects of a mounting fixture described above provide a means by which an electrically insulating and thermally conductive attachment between one or more light emitters, e.g., an LED device, and a heat sink may be achieved. However, as those skilled in the art will readily appreciate from this disclosure, the mounting fixture may be modified in various other ways. These modifications, as well as other techniques for providing an electrically insulating and thermally conductive attachment between one or more light emitters and a heat sink, will be readily apparent to those skilled in the art from the various teachings throughout this disclosure and are well within the scope of the present invention. By providing electrical insulation between the light emitters and the heat sink, the need for an isolated driver, i.e., Class 2 driver, is eliminated.

Figure 11:
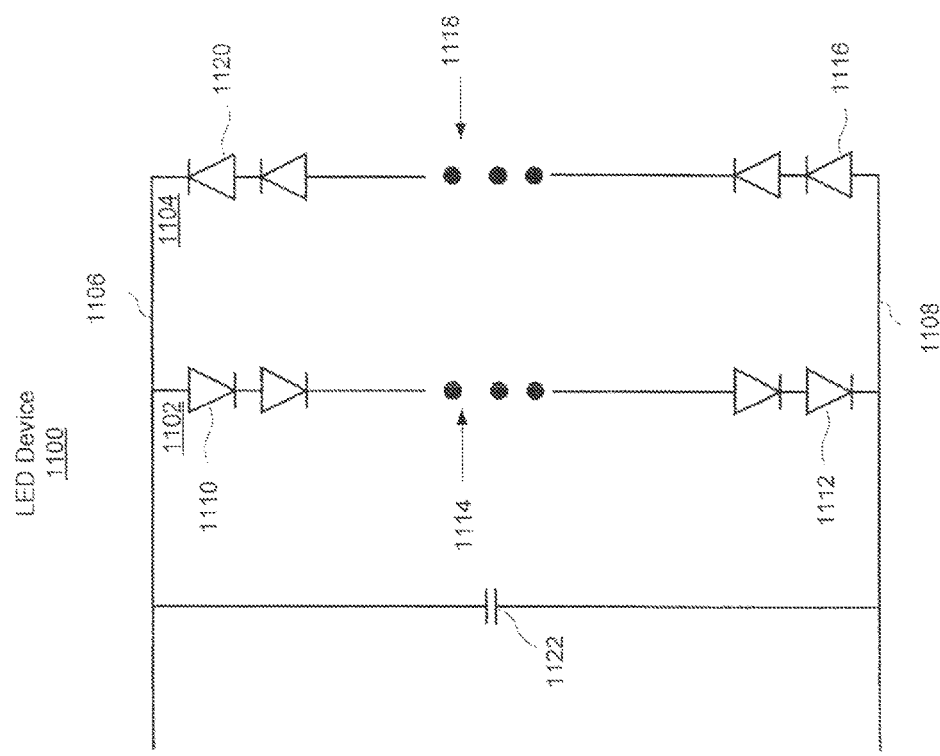
FIG. 11 is a schematic representation illustrating an example of an LED device.

In one configuration of a light source, an LED device that is electrically insulated from the heat sink a mounting fixture or by some other means may be operated driver free, i.e., without a non-isolating or Class 1 driver. In this configuration, the LED device may be powered directly from an AC power. A schematic representation illustrating an example of an LED device having this configuration is shown in FIG. 11. The LED device 1100 includes a parallel circuit having a first branch 1102 and a second branch 1104. The first and second branches 1102, 1104 connect at a first common point 1106 and a second common point 1108. The first and second common points 1106, 1108 provide connection points for an AC power source.

The first branch 1102 is shown with a plurality of LEDs coupled in series. More specifically, the first branch 1102 includes an input LED 1110, a plurality of intermediate LEDs 1112, and an output LED 1114. The input LED 1110 has an anode coupled to the first common point 1106 and a cathode coupled to the first LED in the series of intermediate LEDs 1112. The output LED 1110 has a cathode coupled to the second common point 1108 and an anode coupled to the last LED in the series of intermediate LEDs 1112. Each intermediate LED 1112 has an anode coupled to the cathode of the preceding LED and a cathode coupled to the anode of the following LED.

The second branch 1104 is shown with a plurality of LEDs coupled in series. The second branch 1104 is coupled between the first and second common points 1106, 1108 with reverse polarity of the first branch 1102. More specifically, the second branch 1104 includes an input LED 1116, a plurality of intermediate LEDs 1118, and an output LED 1120. The input LED 1116 has an anode coupled to the second common point 1108 and a cathode coupled to the first LED in the series of intermediate LEDs 1118. The output LED 1120 has a cathode coupled to the first common point 1106 and an anode coupled to the last LED in the series of intermediate LEDs 1118. Each intermediate LED 1118 has an anode coupled to the cathode of the preceding LED and a cathode coupled to the anode of the following LED An AC source (not shown) may be coupled across the first and second common points 1106, 1108. With this configuration, the LEDs in the first branch 1102 will emit light during one half of the AC waveform and the LEDs in the second branch 1104 will emit light during the other half of the AC waveform. A capacitor or capacitor-like device 1122 may be coupled across the first and second common points 1106, 1108 to reduce flicker as the AC waveform transitions between the positive and negative cycles.

The number of LEDs in a branch will vary depending upon the particular application and the overall design constraints imposed on the system. For example, the number of LEDs in a branch might be dictated by the voltage rating of the LEDs. Fewer LEDs may be used in each branch when reduced light is acceptable by placing a series resistor (not shown) in each branch to provide a voltage drop and limit the current. Those skilled in the art will be readily able to determine the appropriate design for each branch for any particular lighting application.

The various aspects of a light source are provided to enable one of ordinary skill in the art to practice the present invention. Various modifications to, and alternative configurations of, the lighting source presented throughout this disclosure will be readily apparent to those skilled in the art, and the concepts disclosed herein may be extended to other lighting applications. Thus, the claims are not intended to be limited to the various aspects of a light source presented throughout this disclosure, but are to be accorded the full scope consistent with the language of the claims. All structural and functional equivalents to the elements of the various aspects of a light source described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A light source, comprising:
   a substrate supporting a plurality of solid state light emitters;
   a thermally conductive mounting fixture having top face and an opposing bottom face and including a recessed opening with the substrate inserted therein such that the light emitters face towards the top face of the mounting fixture and a bottom face of the substrate is aligned with or recessed within the bottom face of the mounting fixture, wherein the bottom face comprises a plurality of protrusions configured to prevent the substrate from sliding through the opening and wherein a height of the protrusions determines whether the substrate is aligned with or recessed within the bottom face of the mounting fixture; and
   a heat sink attached to the bottom face of the mounting fixture with an intermediate layer disposed therebetween that is thermally conductive and provides electrical isolation between the light emitters and the heat sink, such that the light source is structurally configured to power the solid state light emitters by an AC source without a driver, wherein the mounting fixture comprises a periphery and a flange at the periphery, wherein the flange includes one or more openings for one or more screws to attach the mounting fixture to the heat sink.

2. The light source of claim 1, wherein the mounting fixture comprises one or more locking posts configured to attach the mounting fixture to a heat sink.

3. The light source of claim 1, further comprising a capacitor electrically coupled across the set of first light emitters and the set of second light emitters to reduce flicker.

4. The light source of claim 1, wherein the substrate is electrically conductive.

5. The light source of claim 1, further comprising phosphor, and wherein light emitters are encapsulated in the phosphor.

6. A light source, comprising:
   a substrate supporting a plurality of solid state light emitters configured to be powered by an AC source without a driver;
   a thermally conductive mounting frame having a center and a periphery, the substrate being positioned in the center of the mounting frame, such that the light emitters face towards a top surface of the mounting frame, wherein the center of the mounting frame comprises an opening configured to accept the substrate and at least one electrical conductor; and
   a heat sink attached at the periphery at a bottom surface of the mounting frame with an intermediate layer disposed therebetween that is thermally conductive and provides electrical isolation between the light emitters and the heat sink, such that the light source is structurally configured to power the solid state light emitters by the AC source without the driver, wherein the mounting frame comprises a flange at the periphery, the flange having one or more openings for one or more screws to attach the mounting frame to the heat sink.

7. The light source of claim 6, wherein the mounting frame comprises one or more locking posts at the periphery, the locking posts being configured to attach the mounting frame to the heat sink.

8. The light source of claim 6, wherein the light emitters comprises a set of capacitors electrically coupled to the set of first light emitters and the set of second light emitters to reduce flicker.

9. The light source of claim 6, wherein the mounting frame supports the substrate.

10. The light source of claim 1, wherein the light emitters comprise a set of first light emitters connected in series and a set of second light emitters connected in series, the set of first light emitters being connected in parallel to the set of second light emitters with reverse polarity.

11. The light source of claim 6, wherein the light emitters comprise a set of first light emitters connected in series and a set of second light emitters connected in series, the set of first light emitters being connected in parallel to the set of second light emitters with reverse polarity.

12. A light source, comprising:
   a plurality of solid state light emitters configured to be powered by an AC source; and
   a thermally conductive mounting fixture supporting the light emitters, wherein the mounting fixture is configured to be attached to a heat sink, wherein the mounting fixture provides sufficient electrical isolation between the light emitters and the heat sink to eliminate the need for a driver to power the solid state light emitters, wherein the mounting fixture comprises one or more first openings configured to receive one or more wires, and one or more second openings configured to receive one or more electrically conductive contacts, and wherein the one or more first openings and the one or more second openings are arranged such that when the one or more wires are inserted into the one or more first openings and the one or more electrically conductive contacts are inserted into the one or more second opening, the one or more wires and the one or more electrically conductive contacts attach.

* * * * *